June 16, 1936.  B. C. MAXWELL  2,044,587
FOOT MEASURING INSTRUMENT
Filed Dec. 12, 1934
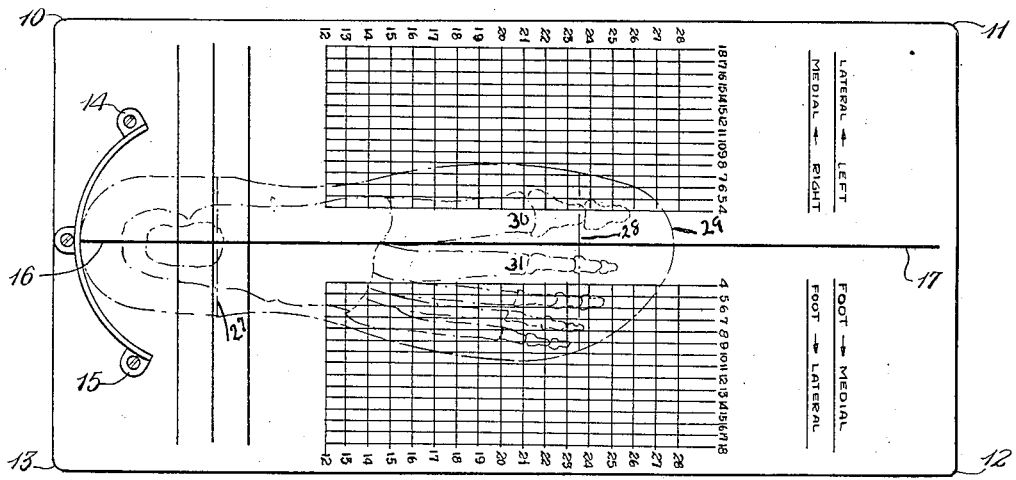
Fig. 1
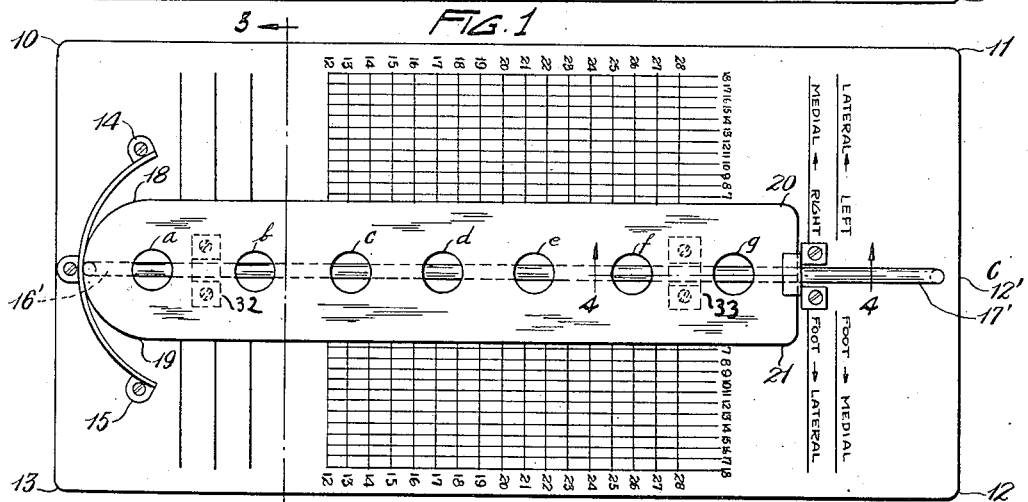
Fig. 2
Fig. 3   Fig. 4
Fig. 6
Fig. 5
INVENTOR.
Bert C. Maxwell
BY

UNITED STATES PATENT OFFICE 2,044,587

FOOT MEASURING INSTRUMENT

Bert C. Maxwell, Cleveland, Ohio

Application December 12, 1934, Serial No. 757,132

13 Claims. (Cl. 33—3)

This invention relates to an instrument for determining measurements of the human foot that are helpful in properly selecting and fitting shoes.

The main object of the invention is to provide an instrument for procuring foot measurements based upon the form and structure of the human foot as revealed by evolutionary findings relating to man.

A further object is to provide an instrument for determining the physiological axis or line of leverage of the foot (the weight-bearing line), and for determining whether the line of leverage of the shoe is in proper relation to the line of leverage of the foot, as to position.

A further object is to provide an instrument for determining the extreme width of the foot, and the extreme width of the part of the foot on either side of the line of leverage in order properly to classify feet as to form and to build and classify shoes according to the form and classification of feet.

A further object is to provide an instrument for determining structural abnormalities and abnormal yielding of the arched, weight-bearing line or line of leverage of the foot.

A further object is to provide a simple, inexpensive, and reliable instrument, applicable alike to either foot, for measuring the length and breadth of the foot, and the width of the part of the foot on either side of the line of leverage.

In order that the merits of this invention, as related to shoe fitting and foot comfort, may be judged with fairness and accuracy, it is necessary to hold in mind the following pertinent facts that are common to the foot of civilized man:

The foot of civilized man has evolved from a foot in which the great toe with its metatarsal extended medially, thumb-like, and the outer toes, the third, fourth, and fifth, with their metatarsals extended slightly laterally, fan-like. These two portions of the foot, the medial and the lateral, gradually moved toward and followed the central weight-bearing line or line of leverage in its movement medialward. In the normal foot of civilized man, this line is known now to pass from the posterior point of the heel directly forward to approximately between the heads of the first and second metatarsal bones, extending parallel to and approximately coinciding with the long axis of the trochlear surface of the talus. This centralward movement of the lateral and medial portions of the foot caused the foot to become longer and narrower, though maintaining its generally straight form.

Feet have not evolved with equal rapidity, nor have their parts, for it has been discovered that in certain cases the inner longitudinal portion, or the outer longitudinal portion, or both have lagged in their movement centralward.

The inner longitudinal portion of the foot embraces the strong, massive bones, and includes the weight-bearing line or line of leverage. This line makes it possible for the foot to perform an essential part in locomotion. The line of leverage is so important that the work of all the tissues of the foot is directed primarily toward maintaining its integrity and stability.

The weight-bearing, bridge-like foot of civilized man is like a man-made, traffic-bearing bridge in every essential, save that the former is movable and forms a part of a living structure, whereas the latter is lifeless and usually stationary. Each has beams, stringers, ties, and piers, the most important being the piers. Destroy a pier or throw it out of alignment, then down goes the weight-bearing line.

The anterior pier is the most important pier of the foot. The base consists of the heads of the metatarsal bones, chiefly the first and second. It serves as a flying-buttress, and when so serving, it is obliged to bear the weight of the body plus the force of body momentum. When the anterior pier is caused to swerve or to break down, the arch and the posterior pier swerve and break down as a consequence.

The most important function of the toes is to brace and stabilize the anterior pier. Strong flexor muscles, pulling rearwardly and parallel to the toes, hold the toes flat and in firm contact with the ground, a digging-in attitude, which tends to prevent the pier from slipping or swerving under the stress or movement of body weighting thus lending material aid to the preservation of the architecture of the foot. Naturally enough, the size of the toe indicates the relative amount of work it is called upon to do.

The foot normally and in regular sequence lengthens, flattens, widens, rolls and rebounds under the stress and movement of body weight. If any of these movements be prevented or obstructed, the sequence is broken and the foot is caused to function at a mechanical disadvantage.

If the human foot is to receive proper support and protection from the shoe, it is obvious that the extreme inside measurements of the shoe, taken from various points and in all directions, shall equal the corresponding extreme outside measurements of the foot, taken when the foot is working, that is, when the foot is bearing body weight.

Instruments now used for determining the proper form and width of the shoe of choice do not take into consideration the piers of the bridge-like foot, particularly the anterior, or the influence the shoe may exert upon the integrity and stability of the line of leverage of the foot. This neglect frequently proves disastrous to both the foot and the shoe. When a shoe fails to provide room sufficient to accommodate the portion of the foot extending from one side of the line of leverage, or when the lateral and medial shoe pressures against the foot are not equal, the anterior pier will be dis-aligned and the line of leverage bent to one side, thereby stretching, straining and breaking down the structures of the foot. Under these conditions, the shoe suffers by reason of the resistance offered by the foot.

While it is claimed that this invention represents marked and valuable improvements over the conventional foot-measuring instruments, its greatest advantages are seen when fitting shoes whose inside measurements are such as will satisfy types of feet based upon size characteristics resulting from differences in evolutionary movement. Upon that basis, three general types of feet are recognized, the regular, the outflare, and the inflare.

The "regular" type includes those feet in which the distance from the line of leverage to the extreme outer side of the foot and that from the line of leverage to the extreme inner side of the foot bear an approximately constant ratio, as 3 to 2. This class shows symmetrical development.

The "outflare" type includes those feet in which the distance between the line of leverage and the extreme outer side of the foot is greater in proportion to the distance between the line of leverage and the extreme inner side of the foot, than is the case in the regular type, as 3¼ to 2. This class shows asymmetrical development.

The "inflare" type includes those feet in which the distance between the line of leverage and the extreme outer side of the foot is less in proportion to the distance between the line of leverage and the extreme inner side of the foot, than is the case in the regular type, as 3 to 2¼. This class shows asymmetrical development.

In the matter of selecting a shoe of proper size and shape, therefore, it is important to locate the line of leverage of the foot, and to determine to which type the foot belongs by means of lateral measurements taken from the line of leverage.

At the present time, shoe fitting consists, chiefly, in determining whether the extreme inside measurements of the shoe correspond to the extreme outside measurements of the foot, measurements usually taken across the ball of the foot and lengthwise the foot. The weight-bearing line or line of leverage receives no consideration, nor is there any definite method employed to provide adequate room for the parts of the foot on either side of the line of leverage, as applied to the normal foot. The invention herein disclosed enables the shoe salesman to select a shoe that provides sufficient room for the parts of the foot adjoining the weight-bearing line, and that exerts equal pressure toward the weight-bearing line, thereby tending to preserve the piers of the arch, to protect and stabilize the line of leverage and, incidently, to add to the life and appearance of the shoe.

Referring to the accompanying drawing:

Fig. 1 is a plan view showing the base of the instrument, the base line, the heel-abutment member, the linear scales extending laterally from the base line and forwardly from the heel-abutment member, and an outline of the sole of the shoe and the skeleton of the foot properly set on the base line, as in the practical use of the instrument.

Fig. 2 is a plan view showing the base of the instrument, the base rod, the heel-abutment member, the linear scales extending laterally from the base rod and forwardly from the heel-abutment member, the balancing member and holes or windows cut through the balancing member through which the base rod may be seen.

Fig. 3 is a transverse sectional view taken of Fig. 2 on line 3—3. Looking in the direction of the arrows, it shows the base, the base rod, the balancing member, the groove in the balancing member, and the heel-abutment member.

Fig. 4 is a longitudinal fragment of Fig. 2 on line 4—4. Looking in the direction of the arrows, it shows a portion of the base, a portion of the base rod member and of the balancing member, and windows through the balancing member, and a clip to hold the balancing member in contact with the rod member.

Fig. 5 is a fragmentary plan view of Fig. 2 showing one method of pivotally supporting the balancing member upon the base.

Fig. 6 is a transverse section on line 6—6, Fig. 5. It shows a transverse view of the pivotal support of the balancing member.

In its most simple form, the invention consists of a base, 10—11—12—13, Fig. 1, having a base line, 16—17, extending lengthwise the upper surface of said base, and graduated scales, as shown by the lines and spaces on either side of the base line, numbered laterally from the base line and forwardly from the posterior or heel end, 16, thereof.

In the practical application of this simple form of the invention, the bare foot, or the foot clothed only with a stocking, is so placed upon the base line, 16—17, that the center of the posterior border of the heel rests upon the posterior end of the base line at 16, and the heads of the first and second metatarsal bones, 30 and 31, lie on opposite sides of the base line forwardly from 16, as shown by the skeleton of the foot in Fig. 1. In this position, the normal line of leverage of the foot approximately coincides with the base line of the measuring instrument.

The correctness of the position of the foot, relative to the base line of the instrument, is now verified by having the customer, while standing, to throw the body weight along the line of leverage of the foot by raising the heel under body weight, as in walking. During this test, it is advisable to set the instrument and the foot in a comfortable toeing-out position. If by observing the balanced movement of body weight from heel to toe, the test shows that the weight-bearing line or line of leverage of the foot follows the base line of the instrument throughout its course, then the position of the foot with respect to said line is correct; but if the weight-bearing line of the foot, the central line of weight movement, does not follow the base line of the instrument from heel to toe, the anterior part of the foot must be moved to the right or to the left, whichever may be necessary, to meet the requirement.

With the foot properly positioned upon the instrument and bearing approximately one-half the body weight, measurements are taken, by means of the graduated scales located upon the base member, laterally from the center of the base line to determine the extreme width of the parts of the foot adjacent the base line, the extreme width of the foot, as a whole, and the type foot being fitted, the latter being determined from the relative widths of the parts of the foot adjacent the base line. Measurements are also taken to determine the extreme length of the foot. From these measurements, the proper type and size shoe can be determined with great accuracy.

After the proper type and size shoe has been selected and fitted to the foot, the foot, clothed with the shoe, is again placed upon the base line of the instrument, as before and as shown in Fig. 1, 29, to determine with a certainty whether the line of leverage of the shoe coincides with that of the foot and with said base line. If, when the shoe-encased foot is caused to go through its tilting movements under body weight, the rearwardmost point of the heel of the shoe and the forwardmost point of the sole of the shoe lie in the base line, the line of leverage of the shoe coincides with said base line and with the line of leverage of the foot. It should be determined, at this time, whether the breast of the heel, 27, extends at right angles to the base line, and also whether the posterior border of the toe cap, 28, extends at right angles to the base line.

The base line of the instrument may be merely a visible line, 16—17, Fig. 1, but it is preferable that it consists of a ridge or rod, as illustrated by line 16'—17', Fig. 2, whose upper surface extends slightly above the upper surface of the instrument. This feature assists in determining the normal weight-bearing line of the foot and of the shoe, by providing a means for balancing the body weight upon the weight bearing line when the foot is encased in the shoe, similar to balancing body weight upon the blade of a skate. Without the protection of the shoe, the sole of the foot would be too soft and the rod too irritating to the foot to serve in this manner.

A further advantage of this instrument is that the correctness of the choice of shoe can be verified by examining the foot, properly placed upon the base rod and encased in the shoe, by means of the X-ray, the rays passing through from directly above the foot. The radiogram will show the position of the line of leverage of the foot, of the shoe, and of the base rod, and whether they coincide, one with another as determined by the instrument.

For convenience and accuracy, an heel-abutment member, 14—15, Fig. 1, is provided.

In a still more desirable form, the invention consists of a base having a rod-like base line and an heel-abutment member, as before described, and a narrow, side-tiltable, balancing member, 18—19—20—21, made of any suitable material, resting upon the base rod, 16'—17', and extending forwardly from the posterior end thereof to approximately the forward end of the base, as shown in Fig. 2. A shallow groove, 22, Fig. 3, extending lengthwise the under surface of the balancing member at approximately its central portion, receives the base rod to permit side-tilting of said balancing member. A line, 26, Fig. 5, drawn lengthwise the upper surface of the balancing member, indicates the position of the base rod beneath. Holes or windows cut through the balancing member, as indicated by a—b—c—d—e—f—g, Fig. 2, reveal the base rod beneath. It is to be noted that in this form of the invention the rod member is not an essential feature, for the balancing member can be supported in position by means of a pivot-like arrangement as shown by 24 and 25, Fig. 5 and Fig. 6, which permits the desirable side-tilting of the balancing member.

The practical application of this more desirable form of the invention is the same as described under the more simple form, but it has this advantage over the former that the body weight can be successfully balanced upon the base rod or above the base line without irritation to the shoeless foot, for the balancing member protects the foot in a way similar to the protection offered by the sole of the shoe.

In this more desirable form of the instrument, the line of leverage of the foot is determined as follows: The shoeless foot is set flat upon the balancing member with the most posterior point of the rounded portion of the heel directly above the heel portion of the ridge or rod member, and a point between the heads of the inner two metatarsal bones directly above the forward portion of said rod member or ridge, in such position that when the body weight is thrown upon the foot, the weight will be balanced upon said balancing member. The heel is now raised and the body weight caused to move forwardly to rest upon the ball of the foot. If the weight remains balanced upon the balancing member throughout this movement, the line of weight-movement will coincide with the balancing ridge or rod, which will indicate the position of the line of leverage of the superimposed foot. But if during this forward movement of body weight, the balancing member tilts to the right or to the left, the forward end of the foot must be moved to the right or to the left, whichever may be necessary to correct the existing imbalance. To determine whether the structural line of leverage of the shoe coincides with that of the foot, the test is repeated with the foot in the shoe. If, when the weight is balanced upon the balancing member, the extreme end points of the shoe rest above the rod member, and the breast of the heel extends at right angles thereto, the line of leverage of the shoe coincides with that of the foot. The windows in the balancing member expose portions of the ridge or rod member to view, thus enabling one more easily to position a short foot upon the balancing member.

It should be noted that if the normal weight-bearing line or line of leverage of the foot, as herein defined, can not be made to coincide with the base line of the instrument, the arch of the foot is breaking down, or the foot is otherwise deformed.

There is no other foot measuring instrument, known to the applicant, that is designed to locate, or especially adapted to locate, the line of leverage of the foot, and to measure the parts of the foot adjacent and lateral thereto, or to determine the type shoe required, or to determine whether the line of leverage of the shoe coincides with the line of leverage of the foot. Nor is there any other shoe measuring instrument that reveals the essential structure and function of the foot and of the shoe so clearly and so practically to the shoe customer.

It should be understood that the invention herein described is susceptible of various modifications and adaptations within the scope of the appended claims.

I claim:

1. In a shoe measuring instrument the combination of a base, a rod member extending lengthwise said base and supported thereupon, graduated scales extending laterally from either side of the rod member and forwardly from one end thereof, and a balancing member supported upon said rod member to permit lateral tilting of said balancing member.

2. A foot measuring instrument comprising a base, a balancing member extending lengthwise the upper surface of said base, means for supporting said balancing member upon said upper surface to permit lateral tilting of said balancing member, and means attached to said instrument for determining lateral, linear measurements from the central axis of said balancing member, and for determining linear measurements forwardly from one end of said balancing member.

3. An instrument according to claim 2, having a distinct line extending lengthwise the upper surface of said balancing member and including the longitudinal axis thereof.

4. An instrument comprising a base, a balancing member extending approximately the length of the upper surface of said base and pivotally supported thereupon to permit lateral tilting of said balancing member, and a heel-abutment member attached to said base at the extreme end of said balancing member.

5. An instrument according to claim 2, having a heel-abutment member attached to said base at the extreme end of said balancing member.

6. An instrument comprising a base, a rod member extending lengthwise said base and supported thereupon, and a balancing member supported upon said rod member, said balancing member having windows at intervals along its axis exposing to view portions of said rod member.

7. In an instrument for locating the balanced weight-bearing line of the human foot, a base and a median elevation secured thereto, said elevation being adapted to support and to balance thereon the weight imposed upon the foot, and to permit lateral lever-like tilting of said foot over said elevation serving as a fulcrum, when said foot is positioned on said instrument.

8. A foot measuring instrument comprising a balancing member and a rod-like ridge extending lengthwise the under surface thereof, and means for supporting said ridge to permit lateral tilting of said balancing member, said ridge serving as a fulcrum.

9. A foot measuring instrument comprising a balancing member, means for supporting said balancing member to permit lateral tilting thereof, and graduated scales extending laterally from the axis of movement of said balancing member and forwardly from one end thereof.

10. In an instrument for locating the balanced weight-bearing line of the human foot and for measuring said foot laterally from said line, the combination of a base, a fulcrum extending lengthwise said base to support and to balance thereon weight borne by said foot when placed lengthwise thereupon, and measuring scales extending laterally from said fulcrum.

11. An instrument according to claim 7, said instrument having a heel-abutment member secured to said base at one end of said base.

12. In an instrument for locating the balanced weight-bearing line of the human foot, a base platform and a rod-like member extending lengthwise the under surface thereof and adapted to support said platform to permit the lateral tilting thereof, and a heel-abutment member located at one end of said platform, said platform being adapted to support and to balance thereon weight imposed upon said foot when said foot bearing weight is positioned on said platform.

13. In an instrument for locating the balanced weight-bearing line of the human foot, a base platform, and means for supporting said platform to permit the lateral tilting thereof, and a heel-abutment member located at one end of said platform, said platform being adapted to support and to balance thereon weight imposed upon said foot when said foot bearing weight is positioned on said platform.

BERT C. MAXWELL.